(12) United States Patent
Werner et al.

(10) Patent No.: US 11,914,967 B2
(45) Date of Patent: Feb. 27, 2024

(54) QUESTION ANSWERING MODELS IN CLOSED DOMAINS

(71) Applicant: Raytheon Company, Tewksbury, MA (US)

(72) Inventors: Steven D. Werner, Garland, TX (US); Robert D. Stell, Sachse, TX (US); Christine Nezda, Richardson, TX (US); Kevin C. Holley, Reston, VA (US)

(73) Assignee: Raytheon Company, Tewksbury, MA (US)

( * ) Notice: Subject to any disclaimer, the term of this patent is extended or adjusted under 35 U.S.C. 154(b) by 821 days.

(21) Appl. No.: 16/913,365

(22) Filed: Jun. 26, 2020

(65) Prior Publication Data
US 2021/0406479 A1    Dec. 30, 2021

(51) Int. Cl.
*G06F 40/40*    (2020.01)
*G06N 5/04*    (2023.01)
*G06N 20/00*    (2019.01)

(52) U.S. Cl.
CPC .............. *G06F 40/40* (2020.01); *G06N 5/04* (2013.01); *G06N 20/00* (2019.01)

(58) Field of Classification Search
CPC ........... G06F 40/40; G06F 40/30; G06N 5/04; G06N 20/00; G06N 3/084
See application file for complete search history.

(56) References Cited

U.S. PATENT DOCUMENTS

| | | |
|---|---|---|
| 9,240,128 B2 | 1/2016 | Bagchi et al. |
| 9,430,461 B2 | 8/2016 | Baughman et al. |
| 10,339,453 B2 | 7/2019 | Balani et al. |
| 2017/0206453 A1 | 7/2017 | Kaufmann et al. |
| 2021/0141860 A1* | 5/2021 | Karagiannis ............ G06N 20/00 |
| 2021/0264208 A1* | 8/2021 | Damodaran ............. G06N 5/02 |
| 2021/0312134 A1* | 10/2021 | Creed .................... G06N 20/00 |

* cited by examiner

*Primary Examiner* — Hope C Sheffield
(74) *Attorney, Agent, or Firm* — Schwegman Lundberg & Woessner, P.A.

(57) ABSTRACT

Discussed herein are devices, systems, and methods for determining an answer to a natural language question. A method can include receiving a question and a passage to be used to answer the question and executing (i) a first trained ML model, based on the passage and the question and in response to determining that the question, passage, or a combination thereof includes more than a first threshold number of out of vocabulary (OOV) words, relative to a general purpose language ML model, to generate a first answer to the question or (ii) executing a second trained ML model, based on the passage and the question and in response to determining the question, passage, or a combination thereof includes less than the first threshold number of out of vocabulary (OOV) words, relative to the general purpose language ML model, to generate a second answer to the question.

17 Claims, 6 Drawing Sheets

QUESTION ANSWERING MODELS IN CLOSED DOMAINS

TECHNICAL FIELD

Embodiments discussed herein regard devices, systems, and methods for improving question answering models in closed domains.

BACKGROUND

Question answering models have recently achieved human level performance. That is, some question answering models can answer questions based on provided text with a same accuracy as a human. These question answering models are trained on vast amounts of (typically) human annotated general purpose language domain data. This training is cost and time prohibitive and the models generated do not work well in closed domains.

DETAILED DESCRIPTION

Figure 1:
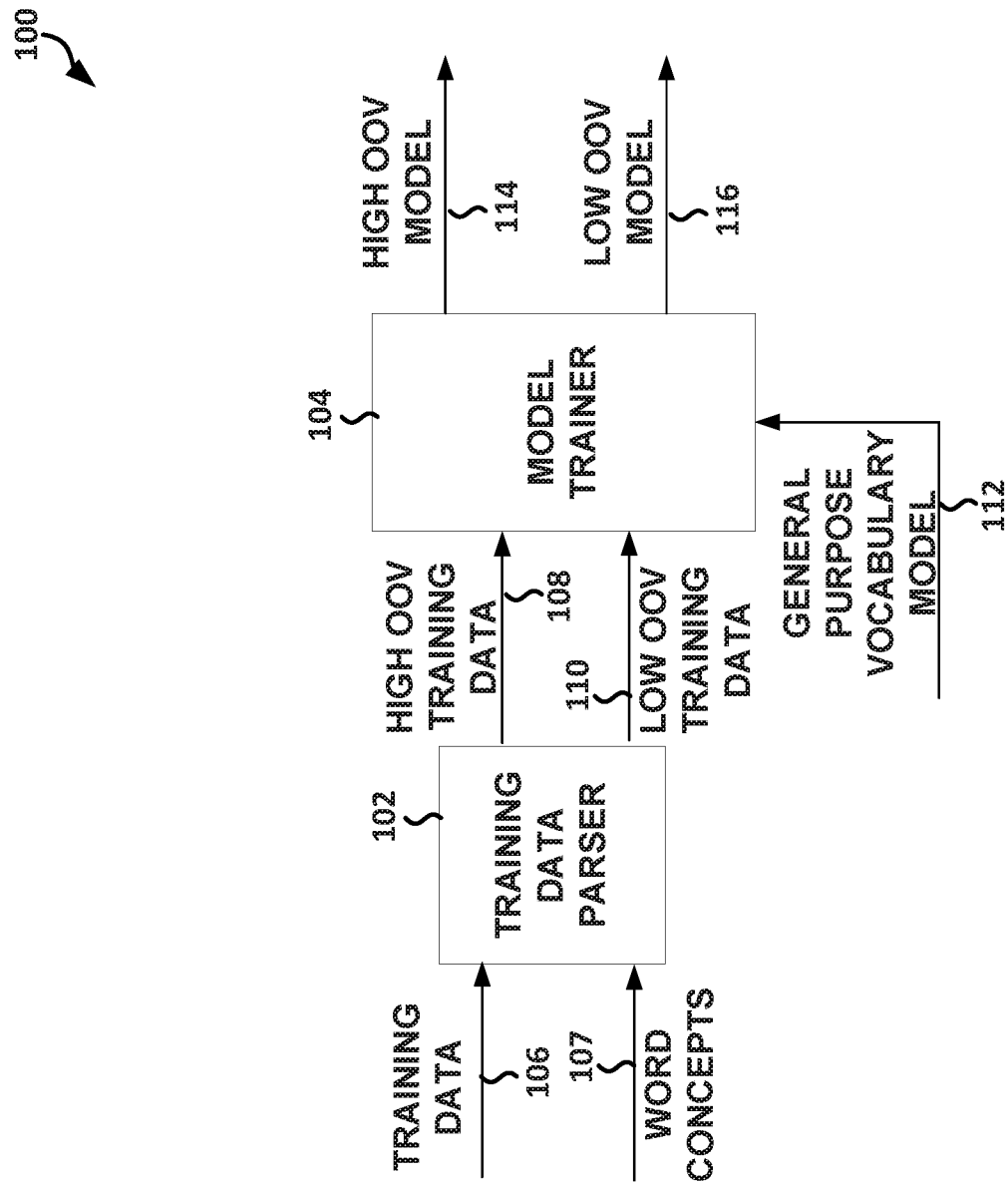
FIG. 1 illustrates, by way of example, a diagram of an embodiment of a system for training an ensemble of models.

Embodiments provide methods, systems, devices, and computer-readable media for efficiently generating question answer models for closed domains. A closed domain is distinguished from a general purpose domain. A closed domain is one with a well-defined topic. An example of a closed domain is the emails, operating procedures, product specifications, or other documents or documentation of a company. The topic in this example is the company and the affairs of the company. An example of a general purpose domain is the content of Wikipedia, where the content covers a broad range of topics at varying levels of detail. A general purpose model means that the model is expected to perform reasonably well on any natural language text (of that language). In contrast, a closed domain model is focused to work better for the target domain at a cost of applicability. The closed domain model is applicable to fewer questions and text passages than the general language model.

In a general purpose question answering model, the goal of training is to generate a model that provides an answer to any question based on a provided passage. In a closed domain model, the goal of training is limited to a proper subset (a subset that is less than the entirety of the set) of the general purpose domain, thus limiting the applicability of the model. A common closed domain is documentation or communications of a company or other organization. For example, the emails, manuals, procedures, incident reports, or other records of the organization can provide the corpus for the closed domain.

A problem encountered in generating a closed domain model includes insufficient training data. For example, consider a military question and answer model. The military typically has more limited resources from which to generate question and answer pairs, and corresponding passages, used to train the model, as compared to the general purpose domain. The data can be so statistically insignificant relative to the entirety of a corpus that a model trained using the data does not sufficiently perform (e.g., above fifty percent accuracy).

A problem encountered in using general purpose model includes poor performance answering a question from the closed domain. This is because the closed domain can include word concepts that are not statistically significant in the data used to train the generally purpose domain model. This results in a de-emphasis of those words or concepts from the closed domain in the general purpose domain model. This de-emphasis results in a reduction in performance of the general purpose domain model on a question that includes concepts more prominent in the closed domain, but not statistically significant in the general purpose domain.

Put another way, the general purpose domain model does not sufficiently account for the lexicon of the closed domain. The closed domain can include word concepts that are more important in the closed domain than those concepts are in general purpose language usage. An example of this is patent law. The words "patentability" or "patentably" can be important to the closed domain of patent law, but not statistically significant in general purpose language usage. "Language" and "vocabulary" may be used interchangeably herein.

Embodiments can help overcome one or more of the problems with the general purpose domain model or closed domain model. The problems can be overcome using one or more of (i) transfer learning the general purpose domain model on subsets of the closed domain corpus to generate an ensemble of closed domain models, (ii) selecting a model of the closed domain model and general purpose domain model based on word concepts of the question to be answered (and passage to use in answering the question); or (iii) selecting the closed domain model based on a structure of the passage (e.g., structured, unstructured, semi-structured, or the like); a combination thereof, among others.

Reference will now be made to the FIGS. to describe non-limiting details of embodiments.

FIG. 1 illustrates, by way of example, a diagram of an embodiment of a system 100 for training an ensemble of models. The system 100 as illustrated includes a training data parser 102 and a model trainer 104. The training data parser 102 can be directly or indirectly coupled to the model trainer 104.

The training data parser 102 can receive training data 106 as input. The training data 106 can include data from a corpus of a closed domain. The training data 106 can include emails, instruction manuals, product descriptions, manufacturing specifications, chat application records, phone records, website information, work product, or other documentation from the closed domain.

The training data parser 102 can receive word concepts 107 used in an general purpose vocabulary model 112. The word concepts 107 can include word embeddings. A word embedding maps a word or phrase from the vocabulary to a vector of real numbers. Global Vectors (sometimes called GloVe) is an example model for generating word embeddings. Another model that generates word embeddings includes Word2Vec.

The training data parser 102 can determine, for each word or phrase in the training data 106, whether the embedding of the word or phrase is present in the word concepts 107. The training data parser 102 can, for each subset of the training data 106, determine how many words or phrases of the subset are not present in the word concepts 107. The words or phrases with corresponding embeddings that are not present in the word concepts are sometimes called out of vocabulary (OOV). OOV is relative to the general purpose vocabulary model 112.

The subsets of the training data 106 that include greater than (or equal to) a threshold number of OOV words or phrases (sometimes called OOV concepts) are considered high OOV training data 108. The remaining subsets of the training data 106 can be considered low OOV training data 110. A threshold, this threshold or another threshold herein, can be determined based on a series of experiments that try to optimize system performance on a validation set. For example, an experiment can be performed to determine model accuracy based on using 2 or more OOV words or phrases as the threshold number. Another experiment can be performed to determine model accuracy based on using 3 or more OOV words or phrases as the threshold number and so on. Then the threshold that corresponds to the highest accuracy can be selected as the threshold. Similar experiments and selections can be made for other thresholds herein.

The data parser 102 can determine word embeddings for the training data 106 or the word embeddings can be provided by another component. The high OOV training data 108 and the low OOV training data 110 from the training data parser 102 can be provided to the model trainer 104.

The model trainer 104 can receive data representing a general purpose vocabulary model 112 and the high OOV training data 108 or the low OOV training data 110. The model trainer 104 can use transfer learning to generate a high OOV model 114. The high OOV model 114 can include the general purpose vocabulary model further trained based on the high OOV training data 108 (and not the low OOV training data 110).

The model trainer 104 can user transfer learning to generate a low OOV model 116. The low OOV model 114 can include the general purpose vocabulary model further trained based on the low OOV training data 108 (and not the high OOV training data 108).

The high OOV model 114 can then be used to determine an answer to a question for which the question, passage, or a combination thereof includes greater than (or equal to) a second threshold number of OOV concepts. The low OOV model 114 can then be used to determine an answer to a question for which the question, passage, or a combination thereof includes less than (or equal to) the second threshold number of OOV concepts.

Note the model can include a deep neural network (NN). A description of NNs and how to use and train them is provided elsewhere herein.

Figure 2:
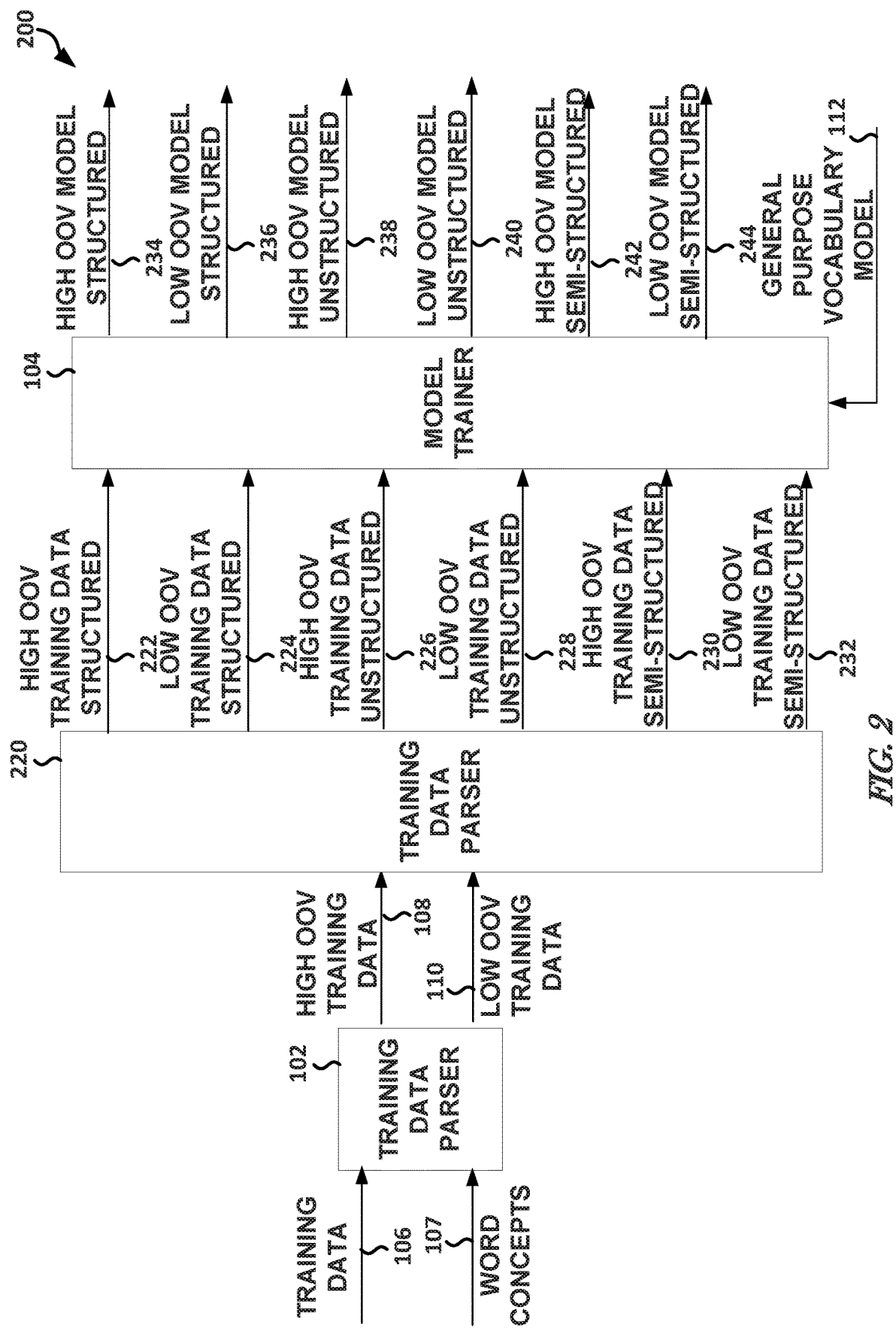
FIG. 2 illustrates, by way of example, a diagram of an embodiment of another system for training an ensemble of models.

FIG. 2 illustrates, by way of example, a diagram of an embodiment of another system 200 for training an ensemble of models. The system 200 as illustrated includes a portion of the system 100, including the training data 106, the word concepts 107, the training data parser 102, the high OOV training data 108, the low OOV training data 110, the general purpose vocabulary model 112, and the model trainer 104. The system 200 is different from the system 100 in that it includes a further training data parser 220. The training data parser 220 can separate the high OOV training data 108 and the low OOV training data 110 by structure of the corresponding data. The structure can include structured, unstructured, semi-structured, or the like.

Splitting the data by structure can help because structure differences can cause the text to change. That is, textual data from each source type can more different from each other than each document is from other documents within the set from the same source type. As an example, StructuredDocX & StructuredDocY can have more textual similarity with each other than they do with any UnstructuredDocZ. The domains can be split into smaller semi-orthogonal domains, such as by using clustering (e.g., k-means clustering or another clustering technique). If a clustering technique is used, the data in each cluster can be more similar in each cluster than it is to data in any other cluster. The cluster to which the data is part of can be indicated by metadata. A model can be learned for each cluster.

Structured data is any data that resides in a fixed field within a record or file. This includes data in a table, spreadsheet, relational database, or the like. Unstructured data is any data that either does not have a pre-defined data model or is not organized in a pre-defined manner. Unstructured data can include emails, word processing documents, presentations, webpages, among others. Unstructured data can include videos, photos, audio files, or the like that have been converted to text by a speech to text program, automated caption generation, or the like. Semi-structured data includes a combination of structured and unstructured data. For example, a word processing document or presentation with a table can include structured data (the data in the table) and unstructured data (words, images, or other content outside the table). Such as word processing document or presentation is considered semi-structured data.

A second data parser 220 can further parse the high OOV training data 108 and the low OOV training data 110. The parsing performed by the second data parser 220 can be based on the structure of the corresponding training data 108, 110. The second data parser 220 can generate subsets (e.g., non-overlapping subsets) of the high OOV training data 108 and the low OOV data 110. The generated subsets can include structured high OOV training data 222, structured low OOV training data 224, unstructured high OOV training data 226, unstructured low OOV training data 228, semi-structured high OOV training data 230, and semi-structured low OOV training data 232. Each of the subsets of training data 222, 224, 226, 228, 230, and 232 can be used for training a different model. The training can include further training the general purpose vocabulary model 112 using transfer learning and a corresponding subset of the training data 222, 224, 226, 228, 230, or 232.

The model trainer 104 can be executed to train a model based on each of the respective subsets of training data 222, 224, 226, 228, 230, or 232. The model trainer 104 can perform transfer learning to impart the vocabulary of the subset of training data 222, 224, 226, 228, 230, or 232 on the general purpose vocabulary model 112. The model trainer 104 can generate a structured high OOV model 234, a structured low OOV model 236, an unstructured high OOV model 238, an unstructured low OOV model 240, a semi-structured high OOV model 242, and a semi-structured low OOV model 244. A collection of two or more of the models, such as the models 234, 236, 238, 240, 242, or 244, or the general purpose vocabulary model 112, is sometimes called an ensemble. The model training can be based on the subset of training data 222, 224, 226, 228, 230, or 232, respectively, and the general purpose vocabulary model 112.

In some instances, one or more of the subsets of training data 222, 224, 226, 228, 230, or 232 can include insufficient data to effect a noticeable change in the general purpose vocabulary model 112 after transfer learning. Generating synthetic training data can help alleviate this problem. More details regarding synthetic training data are discussed elsewhere herein.

Figure 3:
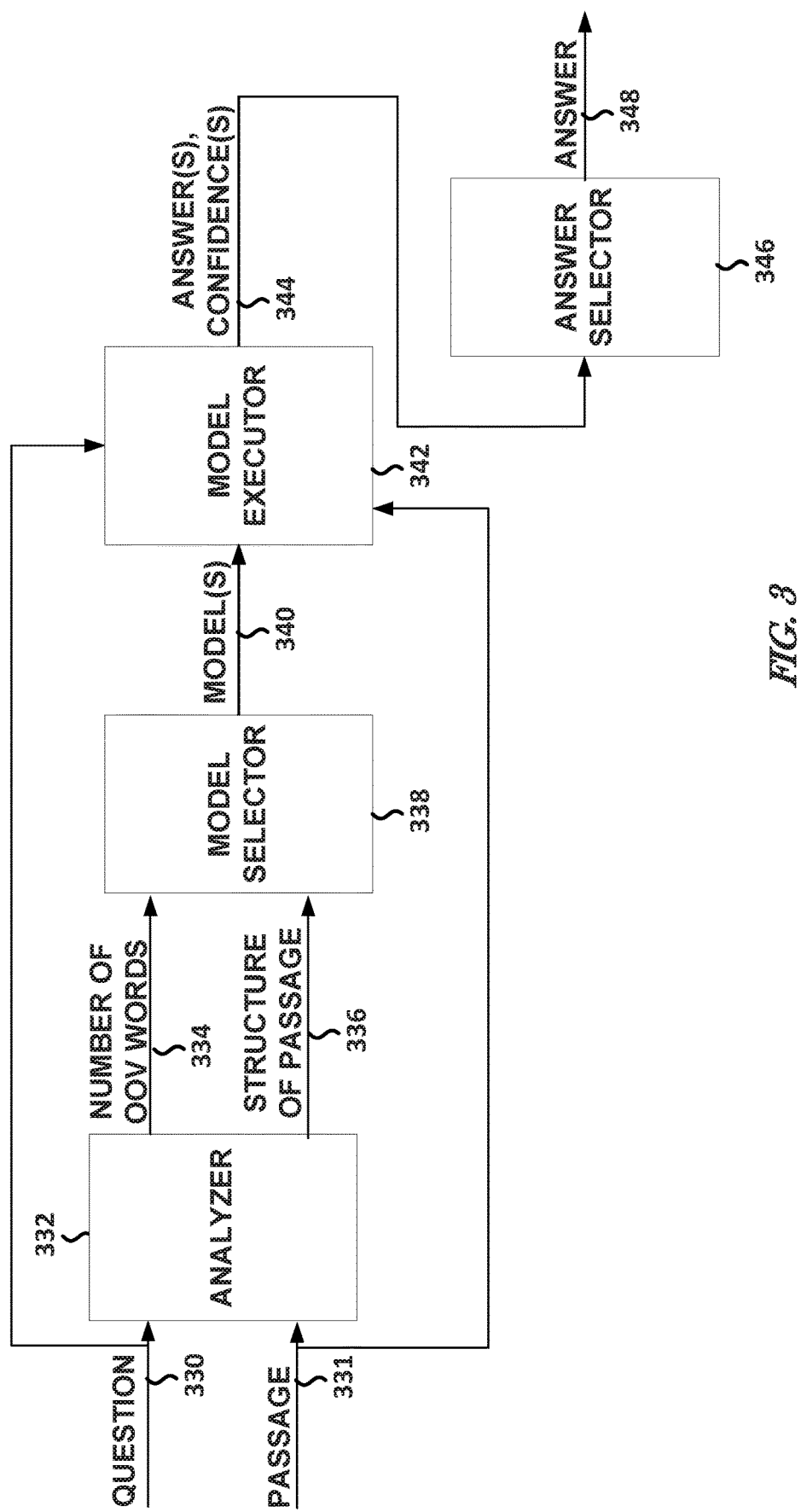
FIG. 3 illustrates, by way of example, a diagram of an embodiment of a system for selecting a model, of an ensemble of models, to answer a question.

FIG. 3 illustrates, by way of example, a diagram of an embodiment of a system 300 for selecting a model, of an ensemble of models, to answer a question. The system 300 as illustrated includes an analyzer 332, a model selector 338, a model executor 340, and an answer selector 346. The analyzer 332 can receive a question and a passage 330. The question can be provided by a user or a device. The question can be a natural language question. The passage is the data that is to be used in determining the answer to the question.

The analyzer 332 can determine a number of OOV words 334 (or phrases) in the question, passage, or a combination thereof. The number of OOV words or phrases can be determined in a similar manner to how the training data parser 102 determines the number of OOV words.

The analyzer 332 can determine a structure of the passage 336. The structure of the passage 336 can be determined based on metadata of the passage 336, the data of the passage, or the like. If the passage is determined to include only one or more tables of data, the passage can be determined to be structured. If the passage does not include any tables or other structured data structures, the passage can be determined to be unstructured. All other data can be determined to be semi-structured.

The model selector 338 can identify which model of the ensemble of models to use to determine an answer to the question 330, based on the passage 331. Remember, the ensemble of models can include two or more of the high OOV model 114, the low OOV model 116, the structured high OOV model 234, the structured low OOV model 236, the unstructured high OOV model 238, the unstructured low OOV model 240, the semi-structured high OOV model 242, the semi-structured low OOV model 244, or the general purpose vocabulary model 112.

The identification of the model can be based on the number of OOV words 334 and the structure of the passage 336. The following table summarizes an example of which model is selected based on the number of OOV words 334 and the structure of the passage 336.

TABLE 1

Summary of parameters defining model selection by the model selector 338.

| Number of OOV words | Structure of passage | Model |
| --- | --- | --- |
| >(=) threshold | Structured | Structured high OOV model 234 |
| >(=) threshold | Unstructured | Unstructured high OOV model 238 |
| >(=) threshold | Semi-structured | Semi-structured high OOV model 242 |

TABLE 1-continued

Summary of parameters defining model selection by the model selector 338.

| Number of OOV words | Structure of passage | Model |
| --- | --- | --- |
| <(=) threshold | Structured | Structured low OOV model 236 |
| <(=) threshold | Unstructured | Unstructured low OOV model 240 |
| <(=) threshold | Semi-structured | Semi-structured low OOV model 244 |

In some instances, the model selector 338 can select more than one model to be executed (and determine an answer to the question 330 based on the passage 331). For example, consider a passage, question, or a combination thereof that includes less than a threshold number of OOV words. In such circumstances, the model selector 338 can select two or more of the models 236, 240, and 244 and the general purpose vocabulary model 112 for execution.

The selected model(s) 340 can be indicated to the model executor 342. The model executor 342 can then execute the selected model(s) 340 based on the question 330 and the passage 331. The model executor 342 can generate an answer and a corresponding confidence 344 based on the question 330 and the passage 331. The confidence can indicate a probability that the answer corresponds to a correct answer.

In instances in which only one model was selected to determine an answer, the answer selector 346 is not needed or it can simply pass the only answer provided as the answer. In instances in which more than one model is selected to provide an answer, the answer selector 346 can determine which answer to select as the correct answer. The answer selector 346 can select the answer based on the confidence(s). The answer with the highest associated confidence can be selected as the correct answer 348.

The closed domain models generated using one or more of the systems of FIGS. 1-3 can provide more accurate answers than a general purpose domain model. The following Table 2 summarizes accuracy of answers using a prior general purpose domain model and an ensemble of models of FIGS. 1-3.

TABLE 2

Accuracy comparison of models

| Question and Answer Type and Content | Accuracy of General Purpose Domain Model (%) | Accuracy of Corresponding Model of Ensemble of Models (%) |
| --- | --- | --- |
| Unstructured High OOV | 58.08 | 63.22 |
| Unstructured Low OOV | 71.27 | 60.45 |
| Semi-Structured High OOV | 61 | 86 |
| Semi-Structured Low OOV | 52.72 | 74.27 |
| Structured Low OOV | 57 | 90 |
| Structured High OOV | 47 | 77.46 |

As can be seen, the ensemble of models approach provided herein outperforms the general purpose domain model (sometimes called the open vocabulary or general purpose language model) in nearly all circumstances. The improvement is particularly high with structured and semi-structured data. And when the model with the best result from the ensemble across the full test set is chosen the performance goes from 61.76% (general purpose language domain) to 73.38% (ensemble).

Figure 4:
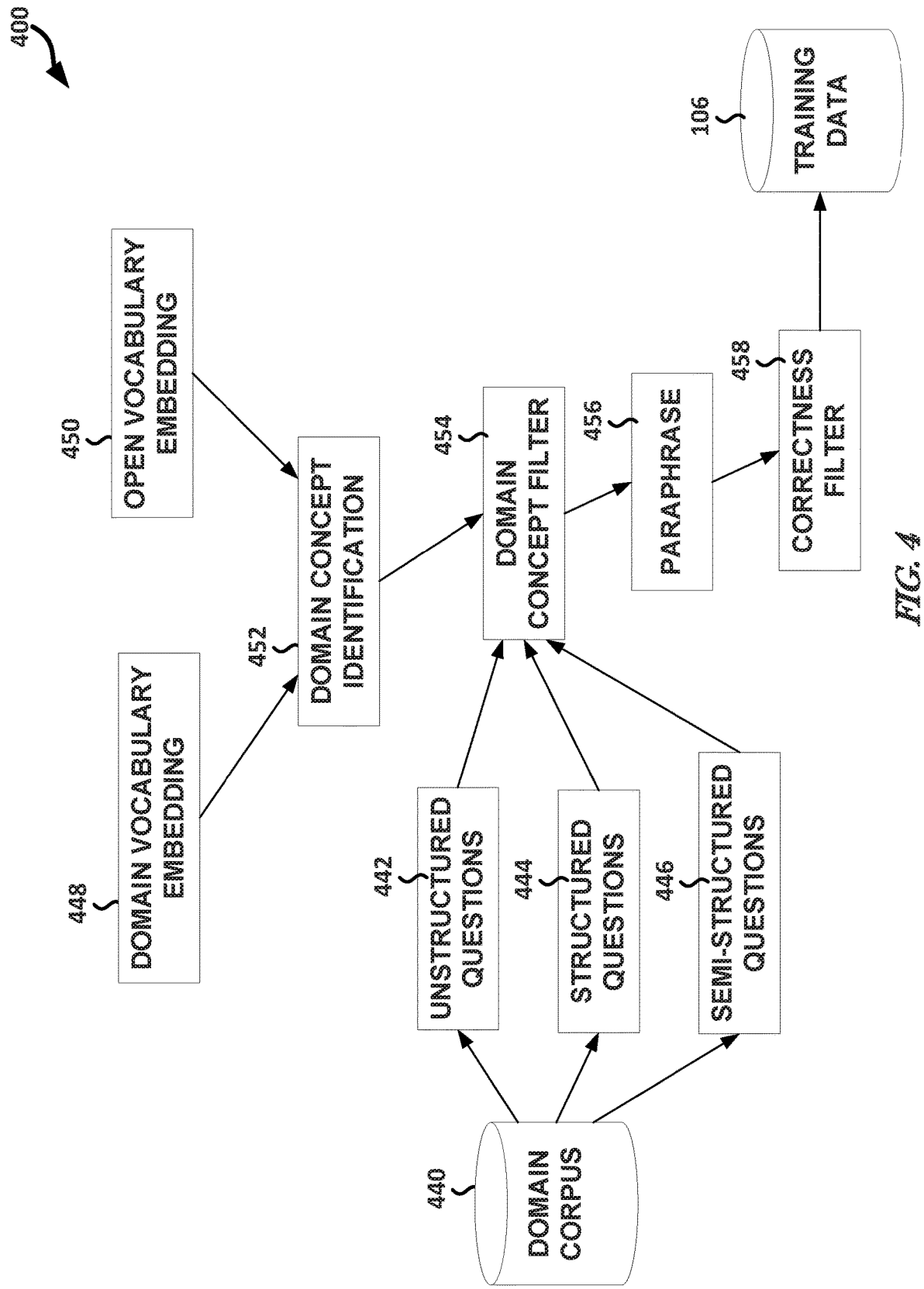
FIG. 4 illustrates, by way of example, a diagram of an embodiment of a system for generating synthetic question and answer pairs.

FIG. 4 illustrates, by way of example, a diagram of an embodiment of a system 400 for generating synthetic question and answer pairs. The synthetic question and answer pairs can be used to supplement data from a closed domain corpus 440, such as to provide more training data. The system 400 as illustrated includes the closed domain corpus 440. Questions can be generated based on the domain corpus 440. The questions can be expressly from the domain corpus 440 or derived from the domain corpus 440. The questions can include one or more unstructured questions 442, structured questions 444, semi- or structured questions 446.

The questions can be generated based on semantic role labels associated with the concepts (embeddings). Semantic role labels can include "Who", "What", "Where", "When", "Why", "How", or the like. The questions can be generated from re-usable table parsing routines for structured data sources. The questions can be generated from fuzzy matching routines for semi-structured data sources.

A domain vocabulary embedding 448 includes the statistically significant word embeddings from the domain corpus 440. A general purpose language vocabulary embedding 450 includes the statistically significant word embeddings in the general purpose language vocabulary model 112. The domain concept identification 452 can identify any embedding that is present in the domain vocabulary embedding 448 that is not present in the general purpose language vocabulary embedding 450. Such an embedding is considered a closed domain concept.

The domain concept filter 454 can receive the generated questions and filter out any questions that do not include a threshold number of closed domain concepts (e.g., one, two, or more domain concepts). Those questions can be considered for inclusion in the training data 106.

The paraphrase 456 operation can substitute one or more words in a questions with corresponding synonyms, alter an order of the words in the question, or the like. The paraphrase 456 operation can increase the number of questions generated.

The correctness filter 458 operation can determine whether the question follows basic grammar rules, such as by examining n-gram probabilities, semantic rules, or the like.

Figure 5:
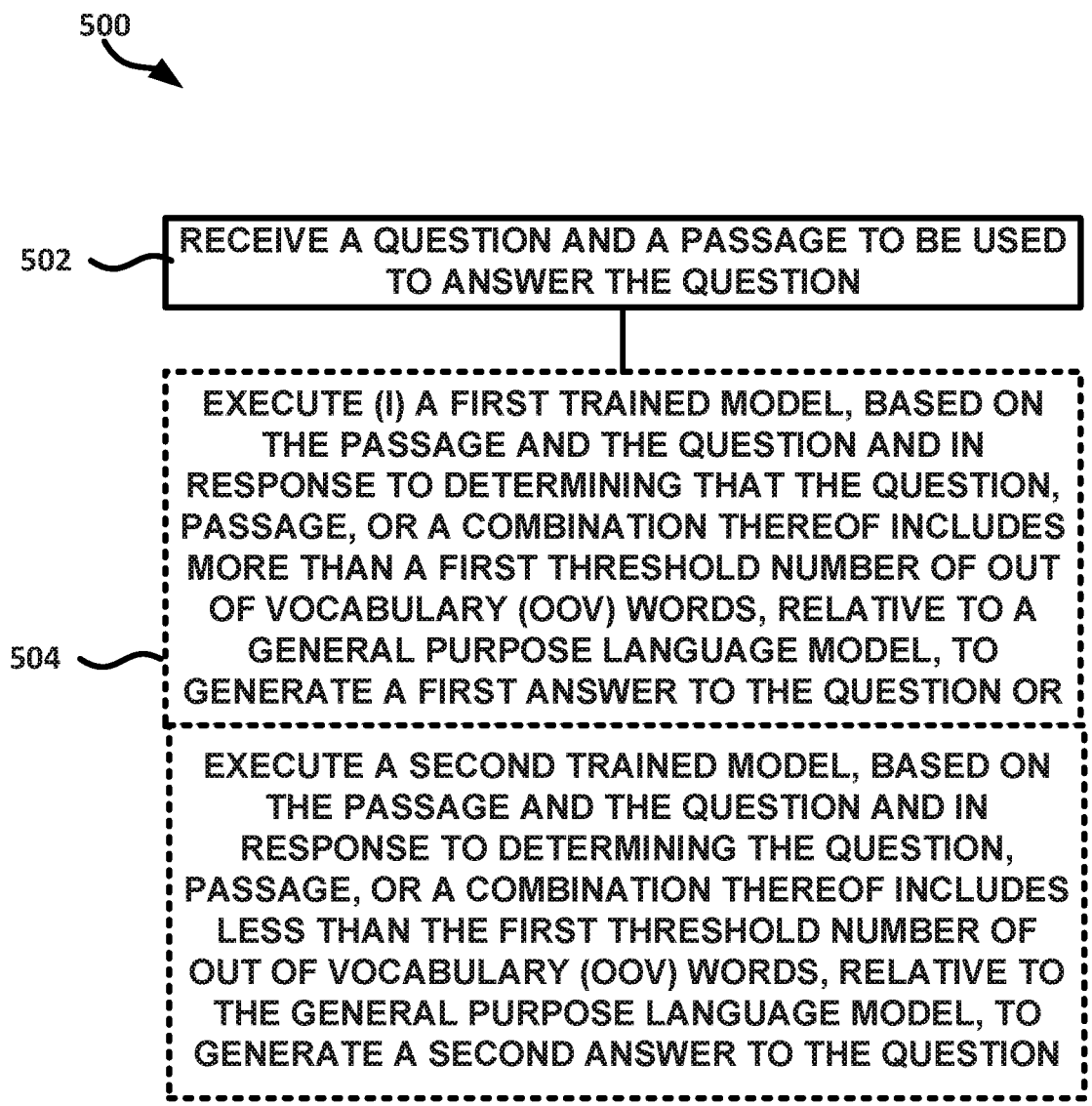
FIG. 5 illustrates, by way of example, a diagram of an embodiment of a method for improved natural language question answering in a closed domain.

FIG. 5 illustrates, by way of example, a diagram of an embodiment of a method 500 for improved natural language question answering in a closed domain. The method 500 can be implemented using one or more of the components or operations of FIGS. 1-4. The method 500 as illustrated includes receiving a question and a passage from which to determine to answer the question, at operation 502; and executing (i) a first trained model, based on the passage and the question and in response to determining that the question, passage, or a combination thereof includes more than a first threshold number of out of vocabulary (OOV) words, relative to a general purpose language model, to generate a first answer to the question or (ii) executing a second trained model, based on the passage and the question and in response to determining the question, passage, or a combination thereof includes less than the first threshold number of out of vocabulary (OOV) words, relative to a general purpose language model, to generate a second answer to the question, at operation 504.

The method 500 can further include parsing the training data into subsets based on a number of OOV words, relative to the general purpose language model, in the training data. The method 500 can further include further training, using transfer learning, the general purpose language model using the training data that includes more than a second threshold number of OOV words, relative to the general purpose language model, to generate the first trained model. The method 500 can further include further training, using transfer learning, the general purpose language model using the training data that includes less than the second threshold number of OOV words, relative to the general purpose language model, to generate the second trained model. The method 500 can further include further parsing the training data based on a semantic structure of the training data.

Further parsing the training data can include generating one or more of a first set of training data that includes structured training data with more than the first threshold number of OOV words, a second set of training data that includes structured training data with less than the first threshold number of OOV words, a third set of training data that includes unstructured training data with more than the first threshold number of OOV words, a fourth set of training data that includes unstructured training data with less than the first threshold number of OOV words, a fifth set of training data that includes semi-structured training data with more than the first threshold number of OOV words, or a sixth set of training data that includes semi-structured training data with less than the first threshold number of OOV words. The method 500 can further include generating, using transfer learning and the general purpose language model, a respective trained model, including the first and second models, based on each respective set of the training data. The method 500 can further include additionally executing the general purpose language model, based on the passage and the question and in response to determining the question, passage, or a combination thereof includes less than the first threshold number of out of vocabulary (OOV) words, to generate a third answer to the question.

The method 500 can further include providing the answer, of the second answer and the third answer, that includes a higher confidence. The method 500 can further include, wherein the training data includes synthetic data generated based on a corpus of domain-specific data that is filtered to include more than a third threshold number of OOV words per passage.

Figure 6:
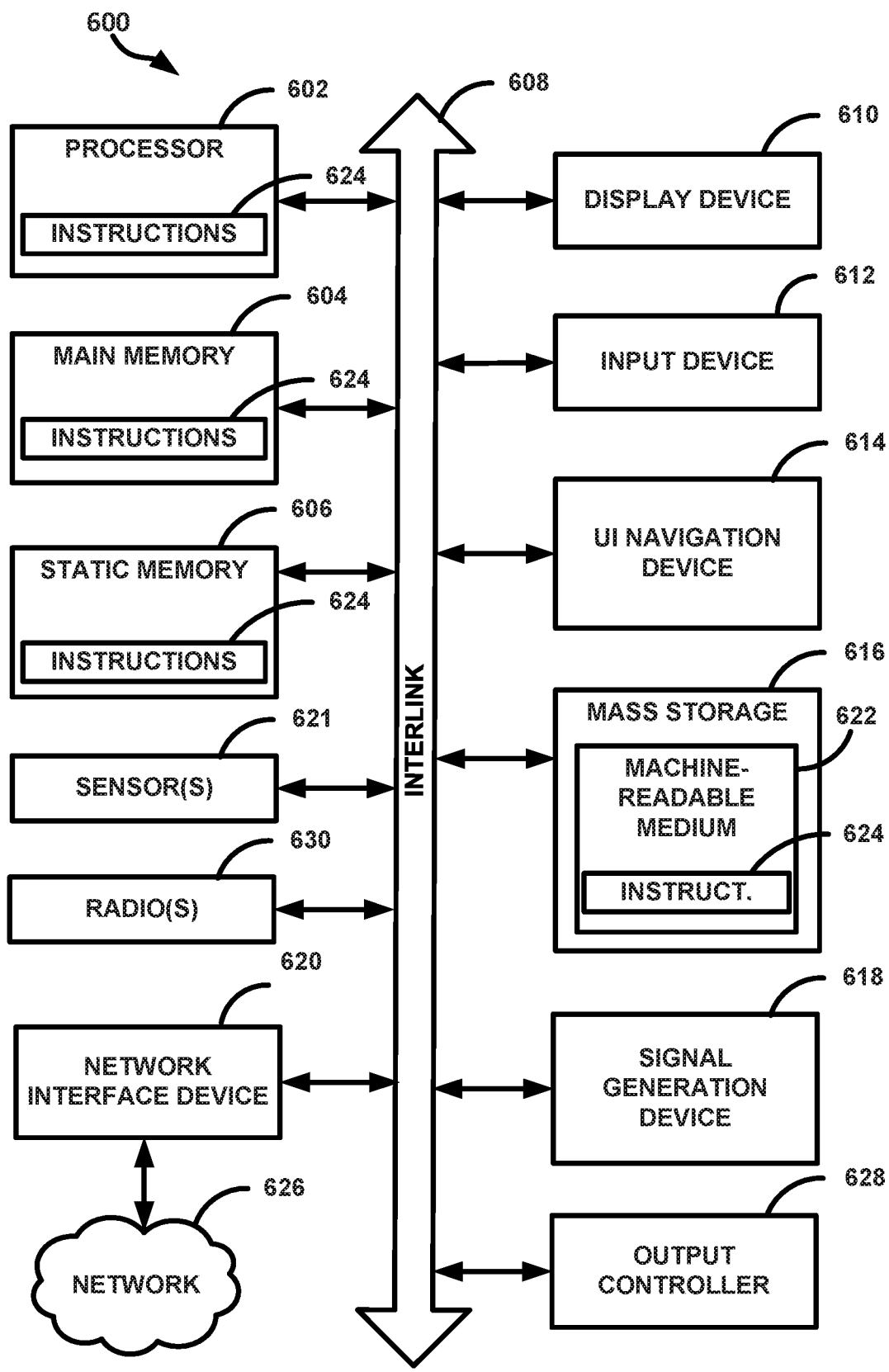
FIG. 6 illustrates, by way of example, a block diagram of an embodiment of a machine in the example form of a computer system 600 within which instructions, for causing the machine to perform any one or more of the methodologies discussed herein, may be executed.

FIG. 6 illustrates, by way of example, a block diagram of an embodiment of a machine in the example form of a computer system 600 within which instructions, for causing the machine to perform any one or more of the methodologies discussed herein, may be executed. One or more of the training data parser 102, model trainer 104, training data parser 220, analyzer 332, model selector 338, model executor 342, answer selector 346, domain concept identification 452 operations, domain concept filter 454, paraphrase 456 operation, or correctness filter 458 can be implemented using, or can include, one or more components of the system 600. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Some embodiments can be implemented using, at one or more operations, aspects of artificial intelligence (AI), including or processing and inferences performed using machine learning (ML) or neural networks (NNs) (e.g., deep NNs). AI is a field of technology concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process (sometimes including ML) is used to arrive at appropriate weights. NN designers typically choose a number of neuron layers or specific connections between layers including circular connection. Instead, a training process generally proceeds by selecting initial weights, which may be specifically or randomly selected. Training data is fed into the NN and results are compared to an objective function that provides an indication of error. The error indication is a measure of how wrong the NN's result is compared to an expected result. This error is then used to correct the weights. Ove iterations, the weights can collectively converge to encode the operational data into the NN. This process may be called an optimization of the objective function (e.g., a cost or loss function), whereby the cost or loss is reduced or even minimized.

A gradient descent technique can be used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight can move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large or small step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

ADDITIONAL NOTES AND EXAMPLES

Example 1 can include a method of determining an answer to a natural language question using one or more models of an ensemble of natural language processing machine learning (ML) models, the method comprising receiving a question and a passage to be used to answer the question, and executing (i) a first trained ML model, based on the passage and the question and in response to determining that the question, passage, or a combination thereof includes more than a first threshold number of out of vocabulary (OOV) words, relative to a general purpose language ML model, to generate a first answer to the question or (ii) executing a second trained ML model, based on the passage and the question and in response to determining the question, passage, or a combination thereof includes less than the first threshold number of out of vocabulary (OOV) words, relative to the general purpose language ML model, to generate a second answer to the question.

In Example 2, Example 1 can further include parsing the training data into subsets based on a number of OOV words, relative to the general purpose language ML model, in the training data.

In Example 3, Example 2 can further include further training, using transfer learning, the general purpose language ML model using the training data that includes more than a second threshold number of OOV words, relative to the general purpose language ML model, to generate the first trained model, and further training, using transfer learning, the general purpose language ML model using the training data that includes less than the second threshold number of OOV words, relative to the general purpose language ML model, to generate the second trained ML model.

In Example 4, at least one of Examples 2-3 can further include further parsing the training data based on a semantic structure of the training data.

In Example 5, Example 4 can further include, wherein further parsing the training data includes generating a first set of training data that includes structured training data with more than the first threshold number of OOV words, a second set of training data that includes structured training data with less than the first threshold number of OOV words, a third set of training data that includes unstructured training data with more than the first threshold number of OOV words, a fourth set of training data that includes unstructured training data with less than the first threshold number of OOV words, a fifth set of training data that includes semi-structured training data with more than the first threshold number of OOV words, and a sixth set of training data that includes semi-structured training data with less than the first threshold number of OOV words, and the method further includes generating, using transfer learning and the general purpose language model, a respective trained ML model, including the first and second ML models, based on each respective set of the training data.

In Example 6, at least one of Examples 1-5 can further include additionally executing the general purpose language ML model, based on the passage and the question and in response to determining the question, passage, or a combination thereof includes less than the first threshold number of out of vocabulary (OOV) words, to generate a third answer to the question.

In Example 7, Example 6 can further include providing the answer, of the second answer and the third answer, that includes a higher confidence.

In Example 8, at least one of Examples 1-7 can further include, wherein the training data includes synthetic data generated based on a corpus of domain-specific data that is filtered to include more than a third threshold number of OOV words per passage.

Example 9 can include a non-transitory machine-readable medium including instructions that, when executed by a machine, cause the machine to perform operations of the method of one of Examples 1-8.

Example 10 can include a system including a memory storing parameters of first and ML models and processing circuitry coupled to the memory and configured to perform the method of one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of determining answers to natural language questions using models of an ensemble of natural language processing machine learning (ML) models, the method comprising:
   receiving a first question of the questions and a first passage to be used to answer the first question;
   determining, based on embeddings of words in the first question and the first passage, a first number of out of vocabulary (OOV) words in the first question and first passage, where OOV is relative to a general purpose language ML model;
   in response to determining that the first number is greater than a first threshold number, executing a first trained ML model of the models to generate a first answer to the first question, the first ML model trained using transfer learning on the general purpose language ML model and first training data that has more than the first threshold number of OOV words;
   receiving a second question of the questions and a second passage to be used to answer the second question;
   determining, based on embeddings of words in the second question and the second passage, a second number of out of vocabulary (OOV) words in the second question and second passage; and in response to determining that the second number is less than the first threshold number, executing a second trained ML model of the models to generate a second answer to the second question, the second ML model trained using transfer learning on the general purpose language ML model and second training data that has less than the first threshold number of OOV words.

2. The method of claim 1, further comprising parsing, based on a number of OOV words, relative to the general purpose language ML model, total training data into the first and second training data.

3. The method of claim 2, further comprising further parsing the total training data based on a semantic structure of the training data.

4. The method of claim 3, wherein further parsing the total training data includes generating:
- a first set of training data that is a subset of the first training data that includes structured training data with more than the first threshold number of OOV words,
- a second set of training data that is a subset of the second training data that includes structured training data with less than the first threshold number of OOV words,
- a third set of training data that is a subset of the first training data that includes unstructured training data with more than the first threshold number of OOV words,
- a fourth set of training data that is a subset of the second training data that includes unstructured training data with less than the first threshold number of OOV words,
- a fifth set of training data that that is a subset of the first training data includes semi-structured training data with more than the first threshold number of OOV words, and
- a sixth set of training data that that is a subset of the second training data includes semi-structured training data with less than the first threshold number of OOV words; and
- the method further includes generating, using transfer learning and the general purpose language model, a respective trained ML model, including the first and second ML models, based on each respective set of the total training data.

5. The method of claim 1, further comprising additionally executing the general purpose language ML model, based on the second passage and the second question to generate a third answer, in response to determining the question, passage, or a combination thereof includes less than the first threshold number of words.

6. The method of claim 5, further comprising providing the answer, of the second answer and the third answer, that includes a higher confidence.

7. The method of claim 1, wherein the first training data includes synthetic data generated based on a corpus of domain-specific data that is filtered to include more than a third threshold number of OOV words per passage.

8. A non-transitory machine-readable medium including instructions that, when executed by a machine, cause the machine to perform operations for of determining answers to natural language questions using one or more machine learning (ML) models of an ensemble of natural language processing machine learning models, the operations comprising:
- receiving a first question of the questions and a first passage to be used to answer the first question;
- determining, based on embeddings of words in the first question and the first passage, a first number of out of vocabulary (OOV) words in the first question and first passage, where OOV is relative to a general purpose language ML model;
- in response to determining that the first number is greater than a first threshold number, executing a first trained ML model to generate a first answer of the answers to the first question, the first ML model trained using transfer learning on the general purpose language ML model and first training data that has more than the first threshold number of OOV words;
- receiving a second question of the questions and a second passage to be used to answer the second question;
- determining, based on embeddings of words in the second question and the second passage, a second number of out of vocabulary (OOV) words in the second question and second passage; and
- in response to determining that the second number is less than the first threshold number, the second ML model trained using transfer learning on the general purpose language ML model and second training data that has less than the first threshold number of OOV words; and
- executing a second trained ML model to generate a second answer of the answers to the second question.

9. The non-transitory machine-readable medium of claim 8, wherein the operations further comprise parsing, based on a number of OOV words, relative to the general purpose language ML model, total training data into the first and second training data.

10. The non-transitory machine-readable medium of claim 9, wherein the operations further comprise further parsing the total training data based on a semantic structure of the training data.

11. The non-transitory machine-readable medium of claim 10, wherein further parsing the training data includes generating:
- a first set of training data that is a subset of the first training data that includes structured training data with more than the first threshold number of OOV words,
- a second set of training data that is a subset of the second training data that includes structured training data with less than the first threshold number of OOV words,
- a third set of training data that is a subset of the first training data that includes unstructured training data with more than the first threshold number of OOV words,
- a fourth set of training data that is a subset of the second training data that includes unstructured training data with less than the first threshold number of OOV words,
- a fifth set of training data that is a subset of the first training data that includes semi-structured training data with more than the first threshold number of OOV words, and
- a sixth set of training data that is a subset of the second training data that includes semi-structured training data with less than the first threshold number of OOV words; and
- the operations further include generating, using transfer learning and the general purpose language model, a respective trained model, including the first and second models, based on each respective set of the total training data.

12. The non-transitory machine-readable medium of claim 8, wherein the operations further comprise additionally executing the general purpose language model, based on the second passage and the second question in response to determining the second question and the second passage includes less than the first threshold number of OOV words, to generate a third answer to the second question.

13. A system comprising:
memory storing data defining parameters of first and second trained ML models trained to determine respective answers to natural language questions based on provided passages; and
processing circuitry coupled to the memory, the processing circuitry configured to:
receive a first question of the questions and a first passage of the passages to be used to answer the first question;
determine, based on embeddings of words in the first question and the first passage, a first number of out of vocabulary (OOV) words in the first question and first passage, where OOV is relative to a general purpose language ML model;
in response to determining that the first number is greater than a first threshold number, execute the first trained ML model to generate a first answer of the answers to the first question, the first ML model trained using transfer learning on the general purpose language ML model and first training data that has more than the first threshold number of OOV words;
receive a second question of the questions and a second passage of the passages to be used to answer the second question;
determine, based on embeddings of words in the second question and the second passage, a second number of out of vocabulary (OOV) words in the second question and second passage; and
in response to determining that the second number is less than the first threshold number, execute a second trained ML model of the models to generate a second answer to the second question, the second ML model trained using transfer learning on the general purpose language ML model and second training data that has less than the first threshold number of OOV words.

14. The system of claim 13, wherein the processing circuitry is further to additionally execute the general purpose language ML model, based on the second passage and the second question in response to determining the second question and second passage includes less than the first threshold number of OOV words to generate a third answer to the second question.

15. The system of claim 14, wherein the processing circuitry is further to provide the answer, of the second answer and the third answer, that includes a higher confidence.

16. The system of claim 13, wherein the first training data includes synthetic data generated based on a corpus of domain-specific data that is filtered to include more than a third threshold number of OOV words per passage.

17. The system of claim 13, wherein the processing circuitry is further to parse, based on a number of OOV words, relative to the general purpose language ML model, total training data into the first and second training data.

* * * * *